(12) United States Patent
Corrigan

(10) Patent No.: US 6,365,211 B1
(45) Date of Patent: Apr. 2, 2002

(54) COOKING AID WITH REDUCED FOAMING

(75) Inventor: Patrick Joseph Corrigan, Cincinnati, OH (US)

(73) Assignee: The Procter & Gamble Co., Cincinnati, OH (US)

(*) Notice: Subject to any disclaimer, the term of this patent is extended or adjusted under 35 U.S.C. 154(b) by 0 days.

(21) Appl. No.: 09/336,397

(22) Filed: Jun. 18, 1999

(51) Int. Cl.⁷ ............................................. A23D 9/00
(52) U.S. Cl. ........................ 426/116; 426/609; 426/811
(58) Field of Search ................................ 426/438, 611, 426/811, 116, 609, 87; D9/547, 563; D7/598

(56) References Cited

U.S. PATENT DOCUMENTS

| | | | | |
|---|---|---|---|---|
| 2,210,043 A | | 8/1940 | Scherr | 99/123 |
| 2,634,213 A | * | 4/1953 | Martin | |
| 2,934,476 A | * | 4/1960 | Zvejnieks | |
| 2,998,319 A | * | 8/1961 | Babayan | |
| 3,307,956 A | * | 3/1967 | Chiu | 426/811 |
| 3,392,040 A | * | 7/1968 | Kass | |
| 3,397,065 A | | 8/1968 | Cunningham et al. | 99/90 |
| 3,645,757 A | | 2/1972 | Gordon et al. | 99/171 CA |
| 3,743,520 A | * | 7/1973 | Croner | 426/87 |
| 3,780,184 A | | 12/1973 | Broderick et al. | 426/65 |
| 3,818,858 A | * | 6/1974 | Kramer | 426/87 |
| 3,821,007 A | | 6/1974 | Carey | 106/244 |
| 3,896,975 A | | 7/1975 | Follmer | 222/192 |
| T941,007 I4 | | 12/1975 | Freeman et al. | 252/400 R |
| 4,023,912 A | * | 5/1977 | Mahler | 426/609 |
| 4,142,003 A | * | 2/1979 | Sejpal | 426/609 |
| 4,163,676 A | * | 8/1979 | Konegsbacher | 426/609 |
| 4,188,412 A | * | 2/1980 | Sejpal | 426/609 |
| 4,192,898 A | * | 3/1980 | Hanson | 426/609 |
| 4,211,802 A | | 7/1980 | Carey | 426/609 |
| 4,283,429 A | | 8/1981 | Todd et al. | 426/250 |
| 4,285,981 A | | 8/1981 | Todd et al. | 426/250 |
| 4,339,465 A | * | 7/1982 | Strouss | 426/609 |
| 4,371,451 A | | 2/1983 | Scotti et al. | 252/305 |
| 4,375,483 A | | 3/1983 | Shuford et al. | 426/330.6 |
| 4,420,496 A | | 12/1983 | Hanson, Jr. et al. | 426/609 |
| 4,439,343 A | * | 3/1984 | Albanee | 426/811 |
| 4,479,977 A | | 10/1984 | Dashiell et al. | 426/609 |
| 4,524,085 A | * | 6/1985 | Purves | 426/811 |
| 4,543,202 A | | 9/1985 | Bartlett et al. | 252/305 |
| 4,547,388 A | | 10/1985 | Strouss | 426/609 |
| 4,608,264 A | * | 8/1986 | Fan | 426/438 |
| 4,621,670 A | * | 11/1986 | Yuen | 426/87 |
| 4,654,201 A | * | 3/1987 | Heine | 426/609 |
| 4,654,221 A | | 3/1987 | Purves et al. | 426/609 |
| 4,710,391 A | | 12/1987 | Kirn et al. | 426/289 |
| 4,788,068 A | * | 11/1988 | Koneshi | 426/116 |
| 4,806,374 A | * | 2/1989 | Willemse | 426/330.6 |
| 4,849,019 A | | 7/1989 | Yasukawa et al. | 106/244 |
| 4,925,692 A | * | 5/1990 | Ryan | 426/531 |
| 4,941,573 A | * | 7/1990 | Fuerstman | 426/87 |
| 4,976,984 A | | 12/1990 | Yasukawa et al. | 426/602 |

(List continued on next page.)

FOREIGN PATENT DOCUMENTS

| | | | | |
|---|---|---|---|---|
| EP | 0256607 | | 2/1988 | ............. C11B/5/00 |
| EP | 0 201 041 | | 11/1998 | ............. A23L/1/22 |
| WO | WO 9105481 | | 5/1991 | ............. A23D/9/00 |
| WO | WO 93/06749 | * | 4/1993 | ................. 426/609 |
| WO | WO 94/09642 | * | 5/1994 | ................. 426/609 |
| WO | WO 94/22313 | * | 10/1994 | ................. 426/609 |
| WO | WO 95/05748 | | 3/1995 | ............. A23D/9/00 |
| WO | WO 95/32610 | | 12/1995 | ............. A01G/1/04 |
| WO | WO 95/34222 | | 12/1995 | ............. A23L/1/23 |
| WO | WO 96/10927 | | 4/1996 | ............. A23L/1/226 |
| WO | WO 98/43497 | | 10/1998 | ............. A23L/1/30 |

OTHER PUBLICATIONS

Stecher, editor. 1968. The Merck Index, 8$^{th}$ edition, Rahway, NJ. p. 946.*
21 CFR 173.340 Apr. 1, 1998.*
McGregor, 1956 Silicones Stop Stick & Form Food Engineering P 52–54, Feb. Issue.*
Kauppi 1951 Silicones Speed, Sanitize Processes Food Industries, Jan. Issue P 44–46, 194.*
Butter–Flavored Alternative For Foodservice Captures 'real butter taste' (Accession No. 84 (08) :N0411 FSTA). Abstract from Food Engineering, (1983) 55 (7) 33.
"Marzola Pro Chef Non_Stick Spray for Fat Free Cooking—Original; Olive Oil Manufacture; Bestfoods Category: Non–Stick Surfacing Products". (Acession No. 1998: 510710 Promt). Abstract from Product Alert, (Sep. 28, 1998).
"Mazola No Stick Butter Flavor Cooking Spray Manufacturer: Best Foods Category: Non Stick Surfacing Products". (Accession No. 97: 584437 Promt). Abstract from Product Alert, (Oct. 27, 1997).
"Choosing the Right Antifoam Agent for the Beverage Line". (Acession No. 90; 219930 Promt). Abstract from Beverage Industry, (May 1990) pp. 11.
Product label: Crisco No–Stick Cooking Spray—Natural Butter Flavor.
Product label: Crisco No–Stick Cooking Spray.
Product label: Professional Crisco—Pan Release.
Product label: Mazola No–Stick Corn Oil Cooking Spray.
Drozdowski, et al.: "Effects of polydimethyl siloxane on rapeseed oil transformation during deep frying" Journal of Food Lipids, vol. 6, No. 3, 1999, pp. 205–213.
Patents Abstracts of Japan, vol. 004, No. 140 (C–026), "Antioxidant Preparation", Publication No: 55089383, Publication Date: Jul. 5, 1980, Nippon Oil & Fats Co. Ltd.

Primary Examiner—Carolyn Paden
(74) Attorney, Agent, or Firm—Melody A. Jones

(57) ABSTRACT

Disclosed is a cooking aid composition that comprises edible oil, emulsifier, silicone polymer, and optionally other ingredients such as flavorant. The cooking aid composition reduces the sticking of food to cooking utensils and delivers desired taste, aroma, and texture to cooked foods. The cooking aid composition may be dispensed from an aerosol can without an undesirable degree of foaming during spraying and cooking. Also disclosed is an article of commerce that comprises the cooking aid composition, a container for containing the composition, and instructions associated therewith.

62 Claims, No Drawings

U.S. PATENT DOCUMENTS

| | | | | |
|---|---|---|---|---|
| 4,983,413 A | * | 1/1991 | Meyer | 426/611 |
| 5,064,678 A | | 11/1991 | Kleman et al. | 426/611 |
| 5,088,649 A | * | 2/1992 | Hanson | 239/329 |
| 5,126,151 A | * | 6/1992 | Bodor et al. | 426/99 |
| 5,156,876 A | * | 10/1992 | Clapp | 426/609 |
| 5,249,747 A | * | 10/1993 | Hanson | 239/373 |
| 5,296,021 A | * | 3/1994 | Clapp | 426/609 |
| 5,330,081 A | * | 7/1994 | Davenport | 222/207 |
| 5,370,732 A | | 12/1994 | Follmer | 106/244 |
| 5,374,434 A | | 12/1994 | Clapp et al. | 426/116 |
| 5,431,719 A | * | 7/1995 | Clapp | 426/609 |
| 5,455,055 A | * | 10/1995 | Stoltz | 426/811 |
| 5,472,482 A | * | 12/1995 | Willets | 426/609 |
| 5,501,867 A | | 3/1996 | Creehan et al. | 426/601 |
| 5,503,866 A | | 4/1996 | Wilhelm, Jr. | 426/609 |
| 5,505,937 A | * | 4/1996 | Castrogiovanni et al. | 424/64 |
| 5,514,405 A | * | 5/1996 | Yokomichi | 426/438 |
| 5,522,175 A | | 6/1996 | Holtz | 47/1.1 |
| H1591 H | * | 9/1996 | Fulcher | 426/601 |
| 5,567,456 A | | 10/1996 | Clapp et al. | 426/116 |
| 5,642,860 A | | 7/1997 | Bush et al. | 239/333 |
| 5,650,185 A | * | 7/1997 | Stoltz | 426/609 |
| 5,650,190 A | | 7/1997 | Buikstra et al. | 426/602 |
| 5,662,956 A | | 9/1997 | Knightly | 426/601 |
| 5,674,549 A | | 10/1997 | Chmiel et al. | 426/602 |
| 5,679,390 A | | 10/1997 | Conover | 426/96 |
| 5,709,048 A | | 1/1998 | Holtz | 47/1.1 |
| 5,800,816 A | * | 9/1998 | Brieva et al. | 424/63 |
| D400,434 S | * | 11/1998 | Amos | D9/347 |
| 5,374,434 C1 | * | 1/1999 | Clapp | 426/609 |
| 5,900,263 A | * | 5/1999 | Gico | 426/87 |
| 5,911,974 A | * | 6/1999 | Brieva et al. | 424/64 |
| 5,965,112 A | * | 10/1999 | Brieva et al. | 424/64 |
| 5,985,298 A | * | 11/1999 | Brieva et al. | 424/401 |

* cited by examiner

COOKING AID WITH REDUCED FOAMING

FIELD OF THE INVENTION

This invention relates to cooking aids which can be applied to cooking utensils, such as baking and frying pans and the like, in order to prevent or reduce the sticking of food to the utensil during cooking. This invention also relates to an article of commerce comprising a cooking aid, a container, and a set of instructions associated with the container.

BACKGROUND OF THE INVENTION

Conventional cooking aids, such as cooking oils and sprays, are used in the preparation of cooked and fresh foods. Such cooked foods can include, but are not limited to, foods prepared by frying, baking, broiling, roasting, and the like. Conventional cooking aids can be applied to the cooking utensils, used as ingredients in baking and frying, or can be used in marinating and sauteeing foods. Typically, conventional cooking oils and shortenings are employed to add flavor, texture, or color to food, and conventional cooking sprays are used to prevent sticking of the food to cooking utensils.

In order to achieve the desired non-stick behavior with a lower level of caloric intake, cooking oil sprays are often employed in place of traditional cooking oils. Many cooking oil sprays employ an emulsifier such as lecithin to improve the anti-stick properties of the spray over that of pure cooking oil alone. However, these emulsifiers can also lead to undesirable foaming during spraying and cooking. Such foaming is unsightly, can interfere with the even application of the oil to the cooking utensil or food product, and can result in clogging of the spray nozzle.

Some attempts have been made to reduce such foaming by adding organic solvents (such as ethanol) or water to the cooking oil spray. However, organic solvents can have a negative impact on the aroma of the spray after spraying, during cooking, and even in the finished food product. Water can adversely affect the non-stick properties of the oil. Water can also negatively impact the stability of the cooking oil spray, since water may provide a medium conducive to the growth of microorganisms.

Accordingly, it would be desirable to provide a cooking aid that prevents food from sticking to utensils, yet has a desirable aroma, can be dispensed as a spray without undesired foaming, and does not contain organic solvents or water.

SUMMARY OF THE INVENTION

Applicant has invented a cooking aid composition that delivers excellent taste, aroma and texture to cooked food. The cooking aid composition provides improved anti-stick benefits, improved browning of food during cooking, and less splattering than is typically exhibited by conventional cooking oils. The cooking aid prevents the sticking of food to cooking utensils, yet can be dispensed as a spray without undesired foaming after spraying and during cooking.

One embodiment of the invention is a cooking aid composition comprising:
(a) edible oil;
(b) emulsifier; and
(c) from about 100 ppm to about 1000 ppm silicone polymer.

Preferably, the cooking aid composition comprises more than about 80% edible oil; no more than about 20% emulsifier; and from about 100 ppm to about 1000 ppm silicone polymer.

The cooking aid composition may be dispensed by a variety of means, including poured from a container or sprayed from an aerosol can. The edible oil provides lubricious mouthfeel, and can be an animal or plant oil. The emulsifier provides anti-stick and browning characteristics to the composition. The silicone polymer reduces the foaming of the composition both after spraying and during cooking, yet is used at such a low level as to have no detectable taste, aroma, or flavor. Furthermore, when the cooking aid is dispensed by spraying, less clogging of the spray nozzle results because the amount of foam that sticks to the nozzle after spraying is reduced. The composition may further comprise a flavoring agent or flavor enhancer.

Another embodiment of the invention is an article of commerce comprising:
(a) a cooking aid composition;
(b) a container for containing the composition;
(c) and a set of instructions associated with the container.

The set of instructions direct the user to use an amount of the cooking aid composition which is sufficient to impart the desired non-stick properties, yet is less than the maximum amount of silicone polymer allowed by the FDA in finished food products for consumption. The set of instructions can be printed material attached directly or indirectly to the container, or alternatively, can be printed, electronic, or broadcast instructions associated with the container.

DETAILED DESCRIPTION OF THE INVENTION

A. Definitions

As used herein, the term "cooking aid" refers to compositions useful in preparing cooked and uncooked foods, including but not limited to cooking oils, cooking sprays, sauces, seasoning compositions, salad dressings, and marinades.

As used herein, the term "edible oil" generally refers to pourable (at room temperature), edible oils derived from animals or plants, including but not limited to fish oils, liquefied animal fats, and vegetable oils, including but not limited to corn, coconut, soybean, olive, cottonseed, safflower oil, sunflower oil, canola, peanut oil, and combinations thereof (hydrogenated, non-hydrogenated, and partially hydrogenated oil). The edible oil can comprise a liquid, or a combination of liquid and solid particles (e.g. fat particles in a liquid base). Alternatively, the edible oil can comprise a fat substitute, such as a sucrose polyester (e.g. olestra). The edible oil can also be a mixture comprising plant oil, animal oil, and/or fat substitute.

As used herein, the term "emulsifier" refers to a substance having molecules with a "hydrophilic" or "water soluble" part, and a "lipophilic" or "fat-like" part. The hydrophilic part is suitable for attaching to most cooking utensil surfaces, forming a layer of cooking oil spray over the surface that resists sticking of the food. The lipophilic part allows the emulsifier to dissolve in, and interact with, the oil in the composition. The emulsifier can also favorably enhance the interaction of the oil with food products, which generally have a high water content and often are resistant to even coating by the oil, and uptake of the oil into the food product. In many cases the emulsifier can interact with the food itself to provide desirable flavor enhancements to the food, and can help provide desirable browning during cooking. Emulsifiers may include, but are not limited to: lecithins, hydroxylated lecithins, acetylated lecithins, single pure components of lecithins (such as phosphatidylcholine, phosphatidylinisitol, phosphatidic acid, and phosphate monoglycerides), monoglycerides, diacetyl tartaric esters of mono- and diglycerides, ethoxylated monoglycerides, acetylated monoglycerides, succinylated monoglycerides, fatty acid esters of polyglycerol, polyethylene glycol fatty acid esters, fatty acid esters of sugar compounds such as sucrose, fatty acid esters of sorbitan, citric acid esters of mono- and diglycerides, lactylic esters of fatty acids and their salts (sodium and calcium), succistearin, or mixtures thereof.

As used herein, reference to "instructions in association with" or "instructions associated with" a container means the instructions are either printed on the container itself, on a label on or attached to the container, or presented in a different manner including, but not limited to, brochures, printed advertisements, electronic advertisements, broadcast or internet advertisements, or other media, so as to communicate the set of instructions to a consumer of the composition in the container. The instructions direct the user to use an amount of the cooking aid composition such that the level of silicone polymer present in the finished food product does not exceed 10 ppm, which is the maximum amount of silicone polymer allowed by the FDA in a finished food product for consumption (see 21 C.F.R. 173.340)

As used herein, all percentages (%) are by weight, unless otherwise indicated.

As used herein, parts per million (ppm) are by weight, unless otherwise indicated.

B. Components of the Cooking Aid Composition

The cooking aid comprises edible oil, emulsifier, silicone polymer, and optionally other ingredients such as a flavoring agent.

1. Emulsifier

The cooking aid composition of the present invention comprises an emulsifier to reduce the tendency of food to adhere to cooking utensils and to provide browning. The composition comprises no more than about 20% emulsifier, preferably no more than about 15% emulsifier, and more preferably no more than about 10% emulsifier. Lecithin is a particularly suitable emulsifier. A suitable lecithin is commercially available from the Central Soya Co. as CENTROPHASE 152® brand. Other preferred lecithin or lecithin-like compounds which can be used include de-oiled lecithin, lysolecithins, phosphatidic acid and its salts, and phospholated monoglycerides.

2. Silicone Polymer

The cooking aid composition comprises silicone polymer to reduce the foaming of the composition both after spraying and during cooking. The silicone polymer also provides for less clogging of the spray nozzle of the cooking oil spray container by reducing the foamed composition that sticks to the front of the nozzle after spraying. The silicone polymer is present at such as level as to have no detectable taste or aroma or flavor. The cooking aid composition comprises from about 100 ppm to about 1000 ppm, preferably from about 400 ppm to about 600 ppm, and more preferably about 500 ppm, silicone polymer. A particularly suitable silicone polymer is polydimethylsiloxane.

3. Edible Oil

The cooking aid composition comprises at least about 80%, and preferably at least about 90%, edible oil. The edible oil can comprise triglycerides, diglycerides, fat substitutes, or mixtures thereof. A suitable fat substitute is sucrose polyester, such as is available from the Procter & Gamble Co. under the trade name OLEAN®.

4. Other Ingredients

Additional flavor ingredients and masking agents can be included in the cooking aid composition. Such additional flavoring and masking agents include, but are not limited to, salt, terpene hydrocarbons, and sunflower oil. Terpene hydrocarbons may be predominantly pure compounds, such as d-limonene, or byproducts of the citrus processing industry, such as cold pressed citrus oils (e.g. lemon, lime, orange, grapefruit, tangerine), citrus essence, or phase oils; or may be terpene mixtures separated from peel or essence oils by distillation or extraction.

Natural and artificial meat flavors, butter flavors, olive oil flavor, fried flavor notes, spicy flavors, spicy, tangy, lemon, garlic, and herb can also be used.

The cooking aid composition can also include ingredients, including but not limited to, antioxidants, chelating agents, amino acids (e.g. alpha amino acids such as cysteine, methionine, lysine, and glycine), artificial and natural sweeteners including sugar (e.g. sucrose, fructose, xylose), vitamins (e.g. Vitamins A, C, E, and the B vitamins), and other nutrients and minerals. For example, the compositions of the present invention can include flavor precursors such as alpha-amino acids, protein hydrolysates, yeast autolysates, reducing compounds, vitamins, and mixtures thereof.

In addition, a suitable edible acid, such as citric acid, may be added to the cooking aid composition to control the pH. Without being limited by theory, it is believed that a pH of between about 4 and about 8, and more preferably between about 5 and about 6, is desirable in the cooking aid composition to control browning of the food prepared therewith. The composition can also include fumed silica; it may be desirable to add fumed silica to elevate the browning point.

C. Components of the Article of Commerce

In one embodiment of the present invention, the cooking aid composition is provided in a container having a set of instructions associated therewith. Any container from which the cooking aid composition can be dispensed, such as by pouring, spraying, scooping or spreading, is suitable. Suitable containers include, but are not limited to, containers having glass, plastic, or multilayer constructions, including squeezable constructions, and having screw caps, snap caps, spray caps, spray nozzles, and/or pouring spouts.

The instructions direct the user to use an amount of the cooking aid composition such that the level of silicone polymer present in the finished food product for consumption does not exceed FDA guidelines of 10 ppm (see 21 C.F.R. 173.340). The instructions are either printed on the container itself, on a label on or attached to the container, or presented in a different manner including, but not limited to, brochures, printed advertisements, electronic advertisements, broadcast or internet advertisements, or other media, so as to communicate the set of instructions to a consumer of the composition in the container.

EXAMPLE

The following example is illustrative of the cooking aid composition of the present invention, but is not intended to be limiting thereof.

A cooking aid composition containing about 92% Crisco Natural Blend® vegetable oil, about 8% Centrophase 152® soya lecithin, and about 500 ppm polydimethylsiloxane is prepared by blending the ingredients. The composition is packaged in a metal container with a plastic spray nozzle, and pressurized with an inert gas. The composition is dispensed into a clean, room-temperature metal frying pan by spraying the composition into the center of the pan for about 1 second.

About 10 seconds after the composition is sprayed into the pan, the composition has the appearance of a clear ring of oil with only a few small bubbles present in the center, and no opaque, puffy foam remains. The odor of the composition during spraying, after spraying, and in finished food products cooked with the composition is that of bland oil. The sticking of food to the pan and to cooking utensils is greatly reduced, compared to the use of conventional vegetable oils.

What is claimed is:

1. A cooking aid composition comprising:
   (a) edible oil;
   (b) emulsifier, wherein said emulsifier comprises lecithin; and
   (c) from about 100 ppm to about 1000 ppm silicone polymer wherein the silicone polymer comprises polydimethylsiloxane.

2. The composition of claim 1, wherein the composition comprises no more than about 20% emulsifier.

3. The composition of claim 2, wherein the composition comprises no more than about 10% emulsifier.

4. The composition of claim 1, wherein the composition comprises from about 400 ppm to about 600 ppm silicone polymer.

5. The composition of claim 4, wherein the composition does not comprise organic solvents or water.

6. The composition of claim 1, wherein the composition comprises at least about 80% edible oil.

7. The composition of claim 6, wherein the composition comprises at least about 90% edible oil.

8. The composition of claim 7, wherein the composition comprises no more than about 20% emulsifier.

9. The composition of claim 7, wherein the composition does not comprise organic solvents or water.

10. The composition of claim 6, wherein the composition comprises no more than about 20% emulsifier.

11. The composition of claim 10, wherein the composition comprises no more than about 10% emulsifier.

12. The composition of claim 1, wherein the composition does not comprise organic solvents or water.

13. The composition of claim 1, wherein the composition does not comprise organic solvents or water.

14. An article of commerce comprising:
   (a) a cooking aid composition comprising:
      (1) edible oil;
      (2) emulsifier; and
      (3) from about 100 ppm to about 1000 ppm silicone polymer; and
   (b) a container for containing the cooking aid composition; and
   (c) a set of instructions associated with the container;
   wherein said instructions direct the user to use an amount of the cooking aid composition such that the level of silicone polymer present in the finished food product for consumption does not exceed 10 ppm.

15. The article of claim 14, wherein the set of instructions is selected from the group consisting of instructions printed on the container, instructions printed on a label attached to the container, brochures, printed advertisements, electronic advertisements, broadcast advertisements, and internet advertisements.

16. The article of claim 15, wherein the cooking aid composition comprises from about 400 ppm to about 600 ppm silicone polymer.

17. The article of claim 16, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

18. The article of claim 17, wherein the cooking aid composition does not comprise organic solvents or water.

19. The article of claim 16, wherein the cooking aid composition does not comprise organic solvents or water.

20. The article of claim 15, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

21. The article of claim 20, wherein the cooking aid composition does not comprise organic solvents or water.

22. The article of claim 15, wherein the cooking aid composition does not comprise organic solvents or water.

23. The article of claim 14, wherein the cooking aid composition comprises from about 400 ppm to about 600 ppm silicone polymer.

24. The article of claim 23, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

25. The article of claim 24, wherein the cooking aid composition does not comprise organic solvents or water.

26. The article of claim 23, wherein the cooking aid composition does not comprise organic solvents or water.

27. The article of claim 14, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

28. The article of claim 27, wherein the cooking aid composition does not comprise organic solvents or water.

29. The article of claim 14, wherein the cooking aid composition does not comprise organic solvents or water.

30. A cooking aid composition comprising:
   (a) at least about 80% edible oil;
   (b) lecithin wherein said lecithin is present at a level of no more than about 10%; and
   (c) from about 100 ppm to about 1000 ppm polydimethylsiloxane.

31. The composition of claim 30, wherein the edible oil is selected from the group consisting of triglycerides, diglycerides, fat substitutes, and mixtures thereof.

32. The composition of claim 31, wherein the lecithin is selected from the group consisting of de-oiled lecithin, lysolecithin, phosphatidic acid, salts of phosphatidic acid, and phospholated monoglycerides.

33. The composition of claim 31, additionally comprising an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

34. The composition of claim 33, wherein the composition does not comprise organic solvents or water.

35. The composition of claim 30, wherein the edible oil comprises triglycerides.

36. The composition of claim 35, wherein the lecithin is selected from the group consisting of de-oiled lecithin, lysolecithin, phosphatidic acid, salts of phosphatidic acid, and phospholated monoglycerides.

37. The composition of claim 35, additionally comprising an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

38. The composition of claim 37, wherein the composition does not comprise organic solvents or water.

39. The composition of claim 30, wherein the edible oil comprises a mixture of triglycerides and diglycerides.

40. The composition of claim 39, wherein the lecithin is selected from the group consisting of de-oiled lecithin, lysolecithin, phosphatidic acid, salts of phosphatidic acid, and phospholated monoglycerides.

41. The composition of claim 39, additionally comprising an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

42. The composition of claim 41, wherein the composition does not comprise organic solvents or water.

43. The composition of claim 30, wherein the lecithin is selected from the group consisting of de-oiled lecithin, lysolecithin, phosphatidic acid, salts of phosphatidic acid, and phospholated monoglycerides.

44. The composition of claim 30, additionally comprising an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

45. The composition of claim 44, wherein the composition does not comprise organic solvents or water.

46. The composition of claim 30, wherein the composition does not comprise organic solvents or water.

47. An article of commerce comprising:
(a) a cooking aid composition comprising:
(1) at least about 80% edible oil,
(2) lecithin, wherein said lecithin is present at a level of no more than about 10%; and
(3) from about 100 ppm to about 1000 ppm polydimethylsiloxane; and
(b) an aerosol spray container for containing the cooking aid composition; and
(c) a set of instructions associated with the aerosol spray container;
wherein said instructions direct the user to use an amount of the cooking aid composition such that the level of polydimethylsiloxane present in the finished food product for consumption does not exceed 10 ppm.

48. The article of claim 47, wherein the cooking aid composition does not comprise organic solvents or water.

49. The article of claim 47, wherein the edible oil is selected from the group consisting of triglycerides, diglycerides, fat substitutes, and mixtures thereof.

50. The article of claim 49, wherein the lecithin is selected from the group consisting of de-oiled lecithin, lysolecithin, phosphatidic acid, salts of phosphatidic acid, and phospholated monoglycerides.

51. The article of claim 49, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

52. The article of claim 49, wherein the cooking aid composition does not comprise organic solvents or water.

53. The article of claim 47, wherein the edible oil comprises triglycerides.

54. The article of claim 53, wherein the lecithin is selected from the group consisting of de-oiled lecithin, lysolecithin, phosphatidic acid, salts of phosphatidic acid, and phospholated monoglycerides.

55. The article of claim 53, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

56. The article of claim 53, wherein the cooking aid composition does not comprise organic solvents or water.

57. The article of claim 47, wherein the edible oil comprises a mixture of triglycerides and diglycerides.

58. The article of claim 57, wherein the lecithin is selected from the group consisting of de-oiled lecithin, lysolecithin, phosphatidic acid, salts of phosphatidic acid, and phospholated monoglycerides.

59. The article of claim 57, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

60. The article of claim 57, wherein the cooking aid composition does not comprise organic solvents or water.

61. The article of claim 47, wherein the lecithin is selected from the group consisting of de-oiled lecithin, lysolecithin, phosphatidic acid, salts of phosphatidic acid, and phospholated monoglycerides.

62. The article of claim 47, wherein the cooking aid composition additionally comprises an ingredient selected from the group consisting of salt, terpene hydrocarbons, natural meat flavors, artificial meat flavors, butter flavors, olive oil flavor, fried flavor notes, spicy flavors, tangy flavors, lemon, garlic, herb, antioxidant, chelating agent, amino acid, artificial sweeteners, natural sweeteners, nutrients, minerals, flavor precursors, edible acid, fumed silica, and mixtures thereof.

* * * * *